United States Patent [19]

Markley et al.

[11] Patent Number: 4,857,121

[45] Date of Patent: Aug. 15, 1989

[54] METHOD FOR PRINTING AND APPLYING LABELS

[75] Inventors: Richard L. Markley, Vandalia; Therell D. Hoblit, Covington, both of Ohio

[73] Assignee: Hobart Corporation, Troy, Ohio

[21] Appl. No.: 175,717

[22] Filed: Mar. 31, 1988

[51] Int. Cl.[4] .......... B32B 31/00

[52] U.S. Cl. .......... 156/64; 156/277; 156/361; 156/384

[58] Field of Search .......... 156/361-363, 156/384, 387, 277, 360; 364/464

[56] References Cited

U.S. PATENT DOCUMENTS

| | | | |
|---|---|---|---|
| 4,183,779 | 1/1980 | Barber | 156/384 X |
| 4,329,191 | 5/1982 | Barber | 156/384 X |
| 4,497,682 | 2/1985 | Hamisch, Jr. | 156/384 |
| 4,615,757 | 10/1986 | Treiber | 156/350 |
| 4,652,317 | 3/1987 | Seestrom | 156/277 X |

*Primary Examiner*—David Simmons

[57] ABSTRACT

A method is disclosed for printing and applying two differing labels each including human readable information onto substantially rectangular packages in a manner such that the information on both labels is readable from one of at least two selectable side edges of the packages. A first label is applied in a selected physical angular orientation by a first label applier such that the human readable information thereon can be read from one selected side edge of the packages. The human readable information for a second label is stored as digital data which is assembled in a print buffer such that when it is printed onto the second label the information can be read from the same selected side edge of the packages once the second label is applied in a fixed physical angular orientation by a second label applier. In accordance with the method, human readable information printed upon two labels applied to packages can be made to read from the same side edges of the packages even though the first one of the labels is rotated to obtain a selected physical angular orientation and the second of the labels is not rotated but applied to the packages in a fixed physical angular orientation.

8 Claims, 4 Drawing Sheets

FIG-8

| LABEL ORIENTATION | STARTING ADDRESS | X | Y |
|---|---|---|---|
| B (NO ROTATION) | K | +I | +L |
| A (90° ROTATION C) | M | -L | +I |
| D (180° ROTATION ) | N | -I | -L |
| C (270° ROTATION C) | L | +L | -I |

WORKING EMBODIMENT: DATA BLOCK SIZE 320 x 154

K = 20
L = 320
M = 48,961
N = 49,280

METHOD FOR PRINTING AND APPLYING LABELS

BACKGROUND OF THE INVENTION

The present invention relates generally to package labeling systems and, more particularly, to a method for coordinating the printing and application of at least two labels each including human readable information onto substantially rectangular packages by two separate label appliers such that the human readable information is oriented to be read from one side edge of at least two selectable side edges of the packages.

Labeling systems have been combined with weighing scales to automatically weigh and label random weight packaged items such as meat and produce in supermarkets. In such systems, package weight, price per unit weight, total price, etc., and commonly a UPC bar code are printed onto labels which are applied to corresponding packages.

It is often desirable to be able to select the physical angular orientation of labels applied to packages. For example, the user of a labeling system may wish to arrange packages with either the longer or the shorter package side edges being parallel to the front of a display case. If labels are applied in a single orientation by a labeling system, the arrangement of packages in a display case is effectively fixed since it is undesirable to have packages oriented with human readable information on the labels running other than upright and horizontally.

To overcome label orientation problems, a number of labeling systems have been developed in the prior art for selecting the physical angular orientation of labels relative to the packages to which they are applied. Examples of such labeling systems are disclosed in U.S. Pat. Nos. 4,124,436 and 3,616,094. A particularly convenient operator-controlled label rotating system is disclosed in U.S. patent application Ser. No. 002,597, filed Jan. 12, 1987, and entitled, "Method and Apparatus for Label Transfer", which application is assigned to the assignee of the present application and is hereby incorporated by reference.

Unfortunately, known prior art arrangements are mechanically controlled and, with the exception of the referenced patent application, tend to be structurally complicated which increases the expense of a label applier while at the same time reducing its reliability. An additional problem that arises with labeling systems which provide for selecting the physical angular orientation of labels relative to packages is the secondary labeling of packages with fluorescent colored merchandising labels which provide additional information to a consumer by identifying and drawing attention to desirable characteristics or sale pricing of the products. For example, hamburger may be designated as "fresh ground", pork chops as "thin cut" or "thick cut", a certain roast beef as the "special of the day", and so forth, and "sale", "family pack", "20% off", or the like, may identify special pricing.

Merchandising labels are often applied by hand such that the orientation of the merchandising label can be manually aligned to read from the same side edge of the package as the pricing label. However, if merchandising labels are automatically applied by a labeling machine, their orientation must be coordinated with the orientation of pricing labels, otherwise, the labels will not read from the same side edges of the packages and will detract from their appearances and ease of readability. An automatic merchandising labeler is disclosed in U.S. Pat. No. 4,615,757 which issued to Fritz F. Treiber on Oct. 7, 1986.

Although the merchandising labeler and the pricing labeler disclosed in the Treiber patent are horizontally movable to position the labels on preferred portions of packages, neither labeler has the ability to control the physical angular orientation of the labels relative to the packages. Since merchandising labels, although desirable from a sales standpoint, are not strictly necessary, label rotating pricing labelers are generally not used to apply such labels due to the expense and often complicated structure of such labelers. This is evident in the Treiber patent wherein the merchandising labeler is of a considerably more simple structure than the pricing labeler to reduce the cost of merchandising label application.

A need exists for a method for automatically labeling packages with at least two differing labels each including human readable information wherein the orientation of the human readable information on the labels can be selected to be read from one of at least two side edges of the packages without requiring all label appliers to perform physical label rotation. Such a labeling method is particularly advantageous where merchandising labels are to be applied since it provides for completely automatic labeling with merchandising labels not only being automatically applied but also being oriented to be read from the same package side edge as are pricing or other labels applied to packages by label rotating appliers.

SUMMARY OF THE INVENTION

It is a primary object of the present invention to provide a method for printing and applying at least two differing labels each including human readable information onto substantially rectangular packages, a first label being applied in a selected physical angular orientation by a first label applier such that the human readable information thereon can be read from one side edge of at least two selectable side edges of the packages, and a second label and any additional labels being applied in fixed physical angular orientations by one or more additional label appliers but printed such that the human readable information on all labels is readable from the same side edge of the packages. The human readable information for the second label and any additional labels is stored as digital data which is assembled in a print buffer such that when it is printed onto a label, the information can be read from the one side edge of the package once applied thereto. In accordance with the present invention, information contained upon labels including merchandising labels which are applied to packages by one or more labelers separate and apart from a pricing labeler, can be made to read from the same sides of the packages as human readable information contained upon the pricing labels even though the pricing labels and hence their human readable information may be applied to the packages in a variety of physical angular orientations.

In accordance with one aspect of the present invention, a method of printing and applying at least two differing labels each including human readable information onto a substantially rectangular package such that the human readable information is oriented to be read from one side edge of at least two selectable side edges of the package comprises the steps of: printing a first label including human readable information; operating a first label applier to apply the first label to a defined portion of the package in a selected physical angular orientation such that the first label can be read from one side edge of the package in accordance with how the package is to be displayed for sale; printing a second label including human readable information which is printed onto the second label in an orientation to be read from the same one side edge of the package when the second label is applied onto the package in a set physical orientation; and, operating a second label applier to apply the second label onto the package in the set physical orientation.

In accordance with the present invention, the method for printing and applying at least two differing labels including human readable information onto substantially rectangular packages further comprises the steps of: selecting the one side edge of the package from which the human readable information is to be read; setting the first label applier to apply a label to the package in accordance with the selected one side edge; setting the second label applier in accordance with the selected one side edge; assembling data representative of the human readable information which is to be printed on the second label in a form corresponding to the selected one side edge of the package from which the information is to be read; and printing the second label in accordance with the assembled data.

The method further comprises the step of generating a control signal in the first label applier to identify the selected one side edge of the package, and the step of setting the second label applier may comprise receiving the control signal from the first label applier. In this way, for example, a merchandising label can be applied in accordance with the present invention such that the human readable information printed on the merchandising label is oriented to be read from the same side edge of the package as human readable information on a pricing label even though the merchandising label is always applied in a fixed angular orientation relative to the package.

In the case of a square label or a label of a sufficient size such that the human readable information can be printed in any orientation thereon without changing the print font, the step of assembling data representative of the human readable information can comprise the steps of: selecting a block of data representative of the human readable information to be printed on the second label; and transferring the selected block of data to a print buffer directly or at an offset of 90°, 180°, or 270° such that the human readable information resulting from printing the contents of the print buffer onto the second label can be read from the bottom side, left side, top side or right side of the label, respectively, which corresponds to the selected one side of the package.

If a label is shaped or sized such that different print fonts must be used for horizontal and vertical printing of the human readable information thereon, then the step of assembling data representative of the human readable information may comprise the steps of: selecting a horizontally readable block of data or a vertically readable block of data; and transferring the selected block of data to a print buffer directly or in inverted form such that the human readable information resulting from printing the contents of the print buffer onto the second label can be read from the bottom side, top side, left side or right side of the label, respectively, which corresponds to the selected one side of the package.

Other objects and advantages of the invention will be apparent from the following description, the accompanying drawings, and the appended claims.

BRIEF DESCRIPTION OF THE DRAWINGS

FIG. 8 shows an illustrative data transfer algorithm for transferring a data block to a print buffer to effect rotation of 0°, 90°, 180° or 270° in the clockwise direction.

DETAILED DESCRIPTION OF THE INVENTION

Figure 1:
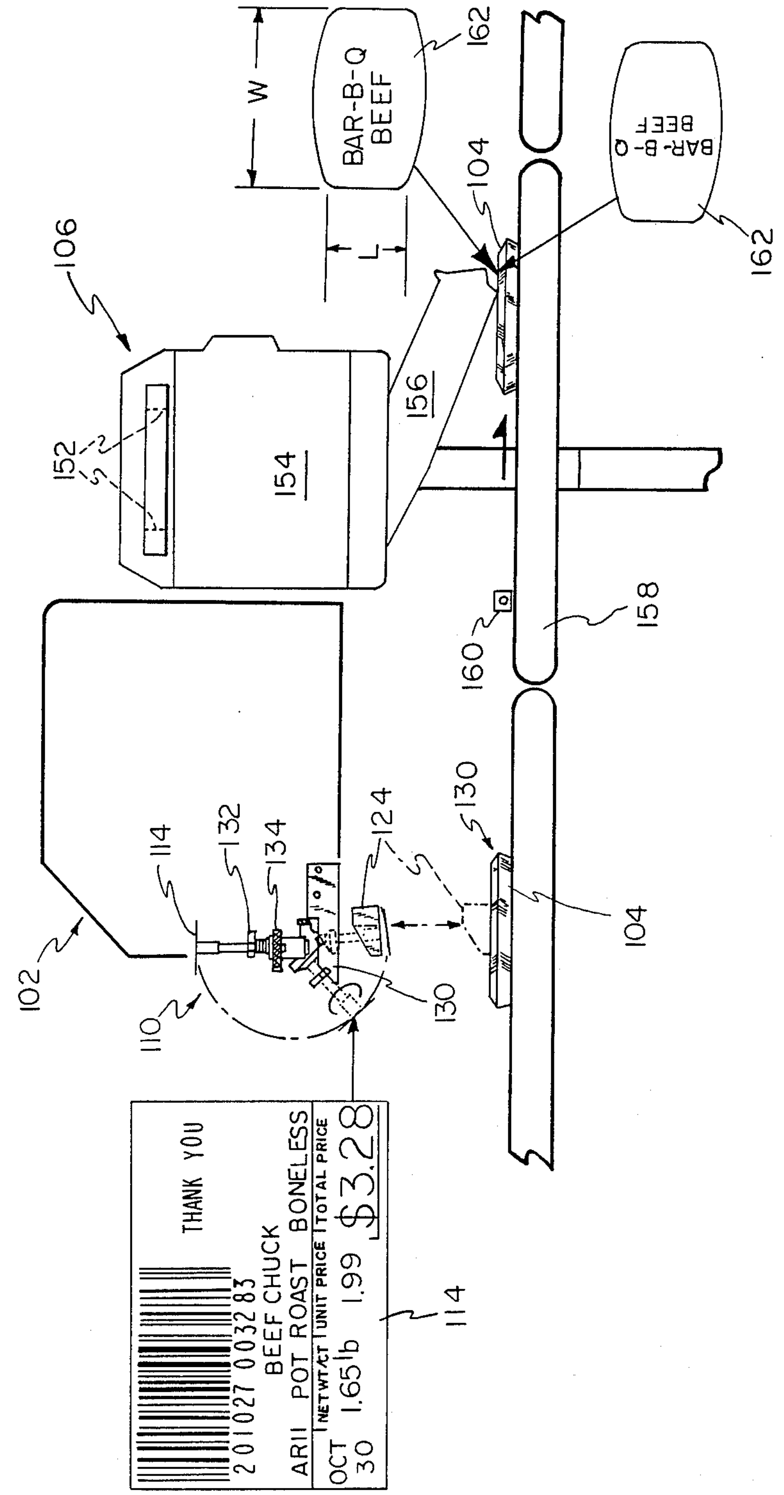
FIG. 1 is a side view of a label rotating price label applier and a coordinated merchandising label applier with the labelers being operable in accordance with the method of the present invention.
Figure 4:
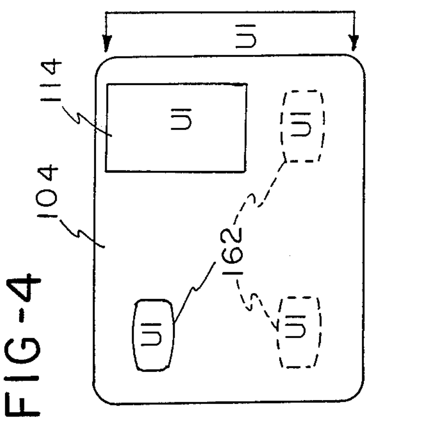
FIGS. 3–6 illustrate packages which have been labeled with a pricing label and at least one coordinated merchandising label with the different labels being oriented such that they can be read from the same side edge of the packages.
Figure 3:
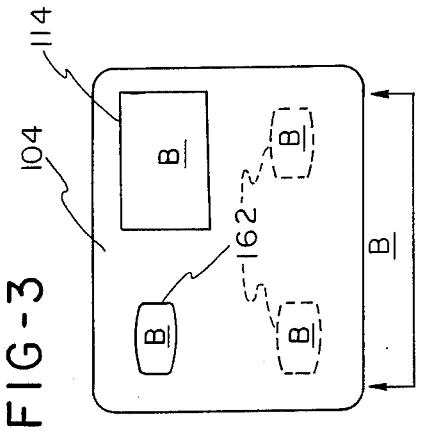

With reference to FIG. 1, a labeling system 100 is shown for practicing the method of the present invention. While the labelers shown in FIG. 1 can be positioned in any order relative to one another, a label rotating pricing labeler 102 is shown as first receiving and price labeling a package 104 which is then passed to a merchandising labeler 106. Specific operation of the label rotating pricing labeler 102 and the merchandising labeler 106 are unimportant to the present invention since the method can be utilized by any label rotating label applier and any fixed orientation label printer/applier which can be coordinated therewith. Accordingly, the labelers 102 and 106 will be described only to the extent necessary to gain an understanding of the present invention. Those seeking additional information regarding the specific labelers 102 and 106 are directed to previously referenced U.S. patent application Ser. No. 002,597, and the U.S. patent application filed on even date herewith and entitled MERCHANDISING LABEL PRINTER/APPLIER, Ser. No. 175,090, both of which patent applications are assigned to the assignee of the present application.

In the label rotating pricing labeler 102, packages are weighed and signals corresponding to the weights are transmitted to a printer which prints labels including such information as the weight, price per unit weight and total price of the corresponding packages. The printed labels have one side coated with a pressure-sensitive adhesive and are delivered to a pick-up station with the adhesive coated side facing upwardly and the printed side facing downwardly. A label positioned at the pick-up station is engaged by the distal end of a transfer nozzle which is pivoted from the pick-up station to a label delivery station by means of a swinging motion through approximately 180°. The delivery station is positioned immediately below a label applicator head which strips the label from the nozzle and forces the label downwardly into adhesive contact with a package to be labeled.

Figure 2:
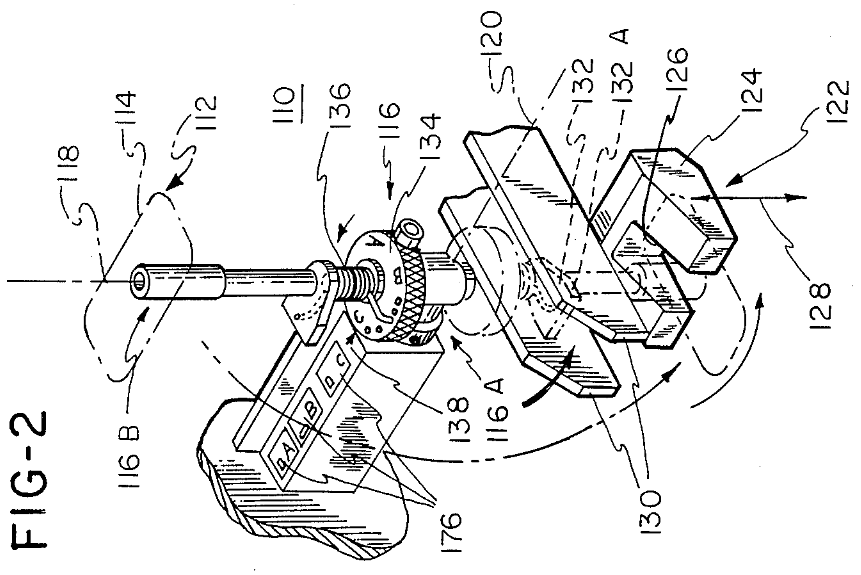
FIG. 2 is a perspective view of a label transfer device in accordance with referenced U.S. patent application Ser. No. 002,597 illustrating how a label is transferred and rotated for application to a package in a selected physical angular orientation.

As best shown in FIG. 2, a label transfer device 110 is positioned generally beneath a label pick-up station 112 which receives labels 114 from a source of labels (not shown) such as a printer or other means for delivering the label 114 to the label pick-up station 102. The label transfer device 110 comprises a label transfer arm 116 having a central axis 118, a base end 116A and a distal end 116B adapted to engage a label at the label pick-up station 112 by means of vacuum. The transfer arm 116 is mounted for first rotational motion about its central axis 118 and second rotational motion about a horizontal axis 120 through it's base end 116A. The second rotational motion about the axis 120 serves to swing the label transfer arm 116 between the label pick-up position 112 and a label delivery position 122. A label applicator head 124 is positioned above the label delivery position 122 and defines a slot 126 into which the label transfer arm 116 is received when the transfer arm 116 is swung into the label delivery position.

Thus the label delivery arm 116 engages the label 114 at the label pick-up position 112 and swings the label through approximately 180° to the label delivery position 122 immediately below the label applicator head 124 which then moves along a fixed vertical path indicated by an arrow 128 from the label delivery station 122 to a package labeling station 130 for applying labels to packages 104 positioned at the package labeling station 130. The positioning of packages at the package labeling station 130 is defined by package side register and a package stop or package pusher as is well known in the art, and hence, will not be described herein.

Guide rails 130 are positioned on both sides of the label transfer arm 116 between the label pick-up position 112 and the label delivery position 122. An eccentric collar 132 is secured to the arm 116 for engaging the rails 130 as the arm 116 is rotated to deliver a label for application to a package. The collar 132 is forced to the position shown in dotted lines toward the bottom of FIG. 2 as the label transfer arm 116 is moved to the label delivery position 122 by the eccentric collar 132 engaging and being rotated by the rails 130 such that its sides 132A are substantially parallel to the rails 130. Accordingly, if the collar 132 is offset from the position shown in the lower portion of FIG. 2 which is a fixed angular orientation for the label transfer arm 116 when in the label delivery position 122, the eccentric collar 132 engages the rail 130 toward which it is directed and is forced into the position defining the fixed angular orientation for the label transfer arm 116.

Since the label transfer arm 116 is thus always forced into a fixed angular orientation about its central axis 118, the angular orientation of labels delivered by the label transfer device 110 is defined by providing an operator controllable angle selector coupled to the label transfer arm 116 for selecting one of at least two different angular orientations of the label transfer arm 116 about its central axis 118 when the label transfer arm 116 is positioned at the label pick-up position 112.

The angle selector comprises a collar or selector ring 134. The selector ring 134 is mounted for rotation about the base of the arm 116A and a torsion spring 136 couples the selector ring 134 to the eccentric collar 132. Accordingly, the angular orientation of the distal end 116B of the arm 116 about its central axis 118 when not restrained by the eccentric collar 132 being received between the rails 130 is selected by rotating the selector ring 134 to one of a number of detents. By coupling the selector ring 134 to the eccentric collar 132 by means of the torsion spring 136, rotation of the selector ring 134 correspondingly rotates the distal end 116B of the arm 116 through the torsional force exerted by the spring 135.

Three pick-up positions A, B and C are illustrated with B being the neutral pick-up position wherein the arm 116 is not rotated as it is swung from the label pick-up position 112 to the label delivery position 122. Positions A and C serve to rotate the distal end 116B of the arm 116 90° in either direction from the fixed angular orientation (setting B). The operator may select the desired orientation for the label by rotating the selector ring 134 such that the corresponding letter is adjacent the arrow 138.

The merchandising labeling system 106, shown in FIG. 1 and more fully disclosed in previously referenced U.S. patent application entitled MERCHANDISING LABEL PRINTER/APPLIER, comprises a controller housing (not shown) with cantilevered support rails 152 extending therefrom for supporting a labeler 154 which moves laterally along the rails 152, i.e., in and out of the plane of FIG. 1. The labeler 154 includes a pivotally mounted labeling arm 156 which is biased by gravity toward a lowermost position adjacent a package conveyor 158 with the labeling arm 156 being biased such that packages 104 can pass thereunder and move the arm 118 upwardly to accommodate a substantial range of package heights varying from approximately 0.5 inches up to and including 5.5 inches.

The merchandising labeling system 106 prints merchandising labels prior to applying them to selected areas of the upper surfaces of the packages 104. The merchandising labeling system 106 is coordinated with the label rotating pricing labeler 102 such that labels are positioned in complementary locations on the upper surfaces of packages to ensure that the labels do not overlap or otherwise interfere with one another. A merchandising label is printed upon the sensing of a package by a package sensor 160 and is then ejected after a defined time period such that the label is applied to a selected area between the leading side edge of the package and the trailing side edge of the package as defined by the direction of package conveyance. The labeler 154 is also capable of being positioned laterally relative to the conveyor 158 to select preferred lateral areas of the upper surfaces of the packages 104.

Figure 9:
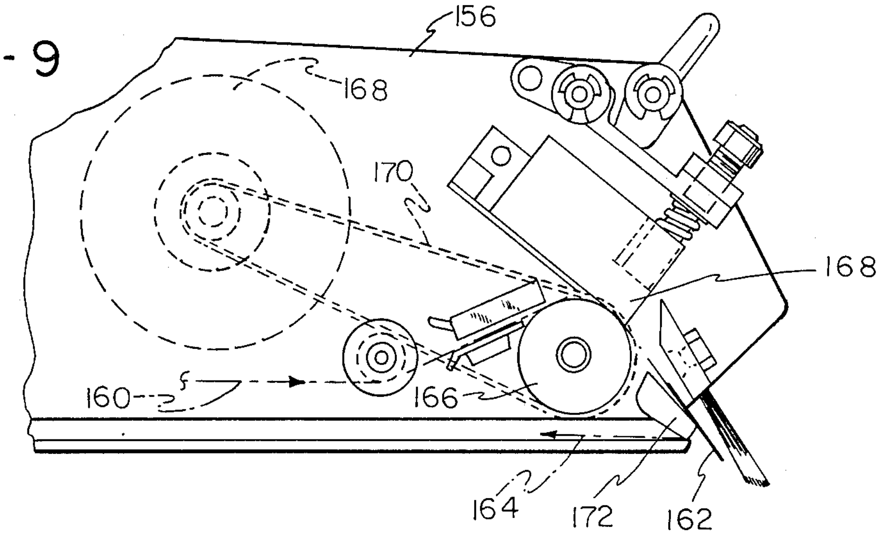
FIG. 9 is a partially broken away side view of the distal end of the labeling arm of the merchandising labeler of FIG. 1.

FIG. 9 is a partially broken away side view of ht distal end of the labeling arm 156 of the merchandising labeling system 106 of FIG. 1. Label stock 160 comprising pressure sensitive labels 162 carried upon a backing strip 164 are passed between a backing roller 166 and a thermal print head 168 with the backing roller 166 being driven by a stepper motor 168 which is coupled to the backing roller 166 by a drive belt 170. The backing strip 164 is maintained in tension by a take-up spindle (not shown) which receives and tensions the spent backing strip 164 after labels 162 are removed therefrom by a label stripper bar 172.

A label 162 is printed by the coordinated operation of the print head 168 and the backing roller 166 which is synchronously driven by the stepper motor 168 via the drive belt 170 to print a designated message on the label 162. Once the label has been printed, it extends beyond the print head 168 and remains secured to the backing strip 164 since the spacing between the print head 168 and the stripper bar 172 is approximately equal to the length of labels 162 to be handled by the merchandising labeling system 106. At the appropriate time for label application, the printed label 162 is ejected by operation of the stepper motor 168 to advance the label stock 160.

In accordance with the present invention, a method provides for printing and applying at least two differing labels each including human label information onto substantially rectangular packages such that the human label information can be read from one side edge of the package which is selected from at least two side edges of the package. A first label is printed and applied in a selected physical angular orientation by a first label applier such that the human readable information thereon can be read from one side edge of the package. A second label, and any additional labels that are to be applied, are applied in fixed physical angular orientations relative to the package by one or more additional label appliers. However, the labels are printed such that the human readable information thereon is readable from the same one side edge of the package.

Figure 6:
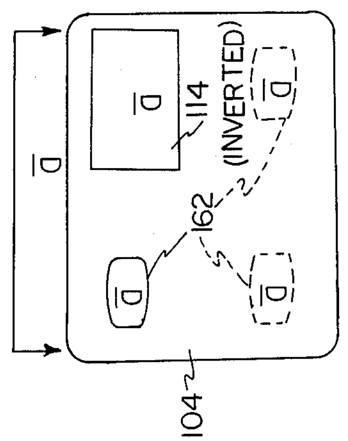
Figure 5:
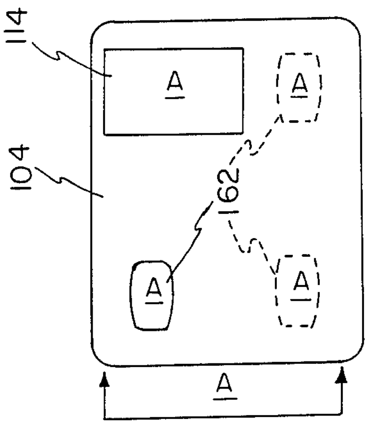

The human readable information for the second label and any additional labels is stored as digital data which is transferred to, or assembled in, a print buffer such that when it is printed onto a label, the information can be read from the one side edge of the package once applied thereto. As shown in FIGS. 3-6, the pricing labels 174 have been applied in four different physical angular orientations B, A, D and C corresponding respectively to no rotation, 90° rotation clockwise, 180° rotation, and 270° rotation clockwise (90° rotation counterclockwise). It is noted that only orientations B, A and C are provided by the label rotating labeler 102. However, a 180° rotation, as shown in FIG. 6, as well as any angular orientation desired by the user could be provided in accordance with the present invention.

For example, label printing in the label rotating pricing labeler 102 could be controlled in accordance with the teachings of the present invention to perform a 180° rotation or inversion of the printed material on the pricing label to apply a D orientation pricing label. The labeler 102 would apply the label without rotation (B orientation) but due to the print rotation, the D orientation would be accomplished. Such print rotations in the labeler 102 would require the use of unprinted label stock or the provision of two alternately printed or wound label stocks which would have to be changed when changing between the B and D orientations. Preprinted pricing label stock is currently favored by many users since it allows them to use unique advertising logos, names and the like which cannot currently be printed in the forms and color combinations required.

While 90° and multiples of 90° rotations are the easiest to perform and the most commonly utilized by labelers, other angular orientations, if desired, could be provided. The calculations for such rotations would be complex or would require graphics capability in the labeler controller provided within the controller housing (not shown). While the pricing labels 114 are rotated to apply the pricing labels 114 in different selected physical angular orientations relative to the packages, each merchandising label 162 is applied in a fixed angular orientation as shown in FIGS. 3-6. However, the human readable information on the merchandising labels 162 is rotated prior to being printed such that the human readable information can be read from the same side of the packages as the physically rotated pricing labels 114 applied to the packages. The merchandising labels 162 are preferably applied in corners of the packages away from the pricing labels such up to that three merchandising labels can be applied to a package or a single merchandising label can be applied in one of the three preferred locations. Of course, additional labels could be applied to packages and could be positioned in other locations on the packages as desired.

The method of printing and applying at least two differing labels each including human readable information onto a substantially rectangular package such that the human readable information is oriented to be read from one side edge of at least two selectable side edges of the package, is performed as follows. Initially a first label, in this case one of the pricing labels 114, including human readable information, is printed by the label rotating pricing labeler 102. The labeler 102 then applies the first label to a defined portion of the package in a selected physical angular orientation (A, B, C or possibly D) such that the first label can be read from one side edge of the package in accordance with how the package is to be displayed for sale. A second label, also including human readable information, is printed, for example by the merchandising labeler 106. Although the second label is applied onto the package in a set physical angular orientation, the information is printed onto the second label in an orientation to be read from the same one side edge of the package. Finally, the second label applier, in this case the merchandising labeler 106, is operated to apply the second label onto the second package in the set physical orientation and preferably at a selected position on the package.

The method can comprise the further steps of selecting the one side edge of the package from which the human readable information is to be read, based for example on how the package is to be displayed for sale, see previously referenced U.S. patent application Ser. No. 002,597. The first label applier 102 is then set to apply a label to the package 104 in accordance with the selected one side edge, for example by setting the selector ring 134 to the A, B or C position. The second label applier, in this case the merchandising labeler 106, is then set in accordance with the selected one side edge and the data representation of the human readable information is assembled to be printed on the second label in a form corresponding to the one side edge of the package from which the information is to be read. The second label is then printed in accordance with the assembled data.

To fully automate the labeling operation, the method may further comprise the step of generating a control signal in the first label applier 102 to identify the selected one side edge of the package. For example, the orientation designations 176 as shown in FIG. 2 can be made into switches which can be activated upon setting the selector ring 134. In this event, the step of setting the second label applier 106 may comprise receiving the control signal from the first label applier 102. In this way a merchandising label can be applied in accordance with the present invention such that the human readable information printed on the merchandising label is oriented to be read from the same side edge of the package as human readable information on a pricing label even though the merchandising label is always applied in a fixed angular orientation relative to the package.

In the case of a square or otherwise symmetrical label or a label of sufficient size such that the human readable information can be printed in any orientation thereon without changing the print font, the step of assembling data representative of the human readable information can comprise the following steps. A block of data representative of the human readable information to be printed on the second label can be selected from a number of preprogrammed messages or messages which are programmed into the controller by the user. The selected block of data is then transferred to a print buffer directly or at an offset of 90°, 180° or 270° such that the human readable information resulting from printing the contents of the print buffer onto the second label can be read from the bottom side, left side, top side or right side of the label, respectively, which corresponds to the selected one side of the package.

Figure 7:
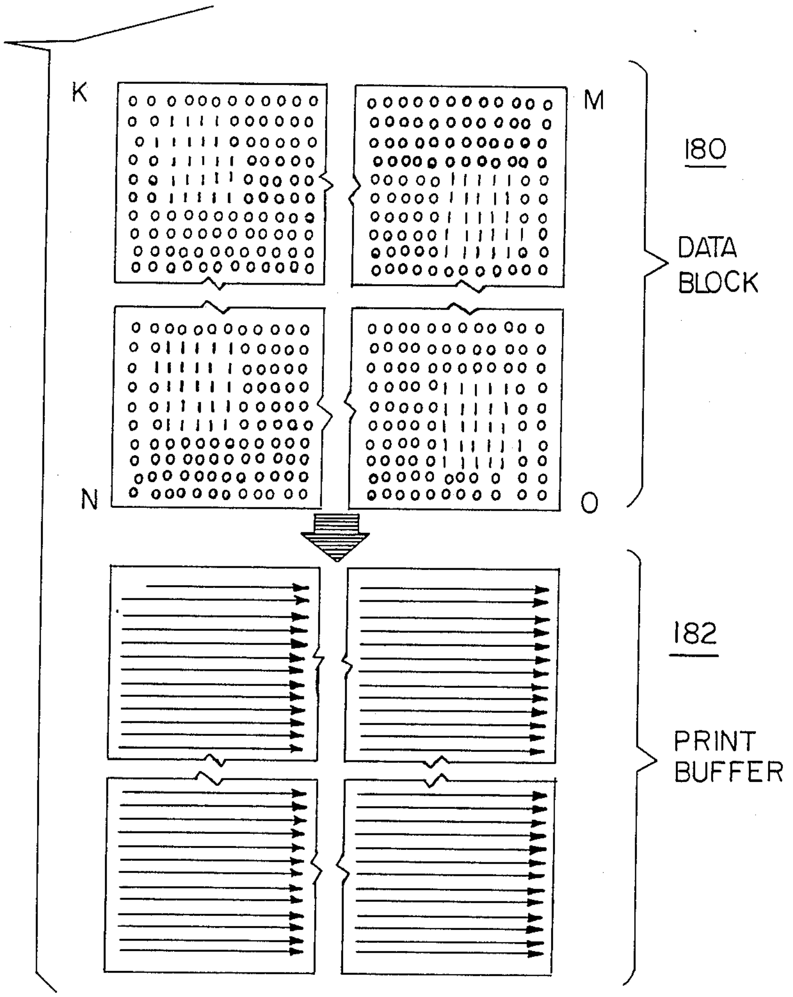
FIG. 7 schematically illustrates a block of data representing the human readable information to be printed on a label and the transfer of that data into a print buffer from which the data is read to control a printer to print the information onto a corresponding label.

The transfer of a data block into a print buffer is represented schematically in FIG. 7. The data block 180 comprises in one working embodiment of the present invention, a block of data having 154 lines of data bits with each line having 320 data bits therein. The absolute addresses of a given data block 180 starting with the zero data bit in the upper left-hand corner are designated in FIG. 7 as K, L, M and N progressing from the upper left-hand corner to the upper right-hand corner to the lower left-hand corner to the lower right-hand corner. One algorithm for transferring the data bits contained within the data block 180 to the print buffer 182 to effect 0° rotation, 90° rotation clockwise, 180° rotation, and 270° rotation clockwise (90° rotation counterclockwise) is shown in FIG. 8.

For a data block size previously noted of 320×154 bits, the addresses of the corners of the block would be K (0), L (320), M (48,961) and N (49,280). For no rotation, the starting address of data transfer, assuming that data is transferred into the print buffer 182 from the upper lefthand corner row by row, would be as follows: for a B label rotation (no rotation), the starting address would be K or 0 with the X increment equal to +1 and the Y increment equal to +L (+320); for an A label rotation (90° rotation clockwise) the starting address would be M or 48,961 with X equal to -L (−320) and Y equal to +1; for a D label rotation (180° rotation) the starting address would be N (49,280) with the X increment equal to −1 and the Y increment equal to -L (−320); and, for a C label rotation (270° rotation clockwise or 90° rotation counterclockwise) the starting address would be L (320) with the X increment equal to +L (+320) and the Y increment equal to −1.

If the label is shaped or sized such that different print fonts must be used for horizontal and vertical printing of the human readable information thereon, then the step of assembling data representative of the human readable information may comprise the following steps. For horizontally readable information, a horizontally readable block of data is selected and for vertically readable information, a vertically readable block of data is selected. The data block selected, either horizontally readable or vertically readable, is then transferred to the print buffer directly, or in inverted form, e.g., the B label orientation transfer and the D label orientation transfer for horizontally readable data, and the A label orientation transfer and the C label orientation transfer for vertically read data, as previously described. In this way the human readable information resulting from printing the contents of the print buffer onto the second label can be readable from the bottom side, top side, left side or right side of the label, respectively, which corresponds to the selected one side of the package.

It should be apparent that a large variety of data storage coding, decoding and transfer arrangements can be applied to the method of the present invention. For example, all data blocks could be stored in the alternate orientations, provided sufficient memory was available, or rotation transform matrices could be provided such that each data block could be stored in one form and transformed by the given rotation matrix such that it was properly oriented in the print buffer for the required label printing operation.

A method has been disclosed for printing and applying at least two differing labels, each including human readable information, onto substantially rectangular packages wherein a first label is applied in a selectable physical orientation by a first label applier such that the human readable information thereon can be read from one side edge of at least two selectable side edges of the packages, and a second label is applied in a fixed physical angular orientation by a second label applier but printed such that the human readable information on all labels is readable from the same side edges of the packages.

While the method herein described constitutes the preferred embodiment of the invention, it is to be understood that the invention is not limited to this precise method, and that changes may be made therein without departing from the scope of the invention which is defined in the appended claims.

What is claimed is:

1. A method for printing and applying at least two different labels each including human readable information onto a substantially rectangular package having a top surface, a bottom surface and four side edges such that said human readable information is oriented to be read from one side edge of at least two selected side edges of said package, said method comprising the steps of:

printing a first label including human readable information:

selecting a desired physical angular orientation for applying said first label such that said first label can be read from one side edge of said package in accordance with how said package is to be displayed for sale;

adjusting an angular orientation control means on a first label applier such that said first label applier will apply said first label to said package in said selected desired physical angular orientation;

operating said first label applier to apply said first label to a defined portion of said package in said selected physical angular orientation;

printing a second label including human readable information which is printed onto said second label in an orientation to be read from said one side edge of said package when said second label is applied onto said package in a set physical angular orientation; and operating a second label applier to apply said second label onto said package in said set physical angular orientation.

2. A method for printing and applying at least two differing labels each including human readable information onto a substantially rectangular package as claimed in claim 1 wherein said method further comprises the steps of:

selecting said one side edge of said package from which the human readable information is to be read;

setting said first label applier to apply labels to said package in accordance with said selected one side edge of said package;

setting said second label applier in accordance with said selected one side edge of said package;

assembling data representative of the human readable information which is to be printed on said second label in a form corresponding to said selected one side edge of said package; and printing said second label from said assembled data.

3. A method for printing and applying at least two different labels each including human readable information onto a substantially rectangular package having a top surface, a bottom surface and four side edges such that said human readable information is oriented to be read from one side edge of at least two selected side edges of said package, said method comprising the steps of:

printing a first label including human readable information:

operating a first label applier to apply said first label to a defined portion of said package in a selected physical angular orientation such that said first label can be read from one side edge of said package in accordance with how said package is to be displayed for sale;

printing a second label including human readable information which is printed onto said second label in an orientation to be read from said one side edge of said package when said second label is applied onto said package in a set of physical angular orientation;

operating a second label applier to apply said second label onto said package in said set physical angular orientation;

selecting said one edge of said package from which the human readable information is to be read;

setting said first label applier to apply labels to said package in accordance with said selected one side edge of said package;

setting said second label applier in accordance with said selected one side edge of said package;

assembling data representative of the human readable information which is to be printed on said second label in a form corresponding to said selected one side edge of said package;

printing said second label from said assembled data; and generating a control signal in said first label applier to identify said selected one side edge of said package, and wherein the step of setting said second label applier comprises receiving said control signal from said first label applier.

4. A method for printing and applying at least two differing labels each including human readable information onto a substantially rectangular package as claimed in claim 3 wherein the step of assembling data representative of the human readable information comprises the steps of:

selecting a block of data representative of the human readable information to be printed on said second label; and transferring the selected block of data to a print buffer directly or at an offset of 90°, 180°, or 270° such that the human readable information resulting from printing the contents of said print buffer onto a label can be read from the bottom side, left side, top side or right side of said label, respectively, which corresponds to said one side of said package.

5. A method for printing and applying at least two differing labels each including human readable information onto a substantially rectangular package as claimed in claim 4 wherein the step of assembling data representative of the human readable information comprises the steps of:

selecting a horizontally readable block of data or a vertically readable block of data; and transferring the selected block of data to a print buffer directly or in inverted form such that the human readable information resulting from printing the contents of said print buffer onto a label can be read from the bottom side, top side, left side or right side of said label, respectively, which corresponds to said one side of said package.

6. A method for printing and applying at least two differing labels each including human readable information onto a substantially rectangular package as claimed in claim 5 wherein said first label comprises a pricing label and said second label comprises a merchandising label.

7. A method for printing and applying at least two differing labels each including human readable information onto a substantially rectangular package as claimed in claim 6 wherein the step of printing said pricing label further comprises rotating the print thereon.

8. A method of printing and applying at least two different labels each including human readable information onto a substantially rectangular package as claimed in claim 1 wherein said label appliers are operated in a timed sequence so as to apply said labels to said package in positions which are relatively displaced in the direction of package flow.

* * * * *